(12) United States Patent
Mueller et al.

(10) Patent No.: US 10,007,979 B2
(45) Date of Patent: Jun. 26, 2018

(54) KEY IDENTIFICATION SYSTEM

(71) Applicant: The Hillman Group, Inc., Cincinnati, OH (US)

(72) Inventors: Michael A. Mueller, Phoenix, AZ (US); George Lynn Hagen, Las Vegas, NV (US); Scott Basham, Chandler, AZ (US); Ryan Hamblin, Apache Junction, AZ (US); Carl Ito, Scottsdale, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 13 days.

(21) Appl. No.: 15/387,731

(22) Filed: Dec. 22, 2016

(65) Prior Publication Data
US 2017/0103516 A1 Apr. 13, 2017

Related U.S. Application Data

(60) Division of application No. 13/940,156, filed on Jul. 11, 2013, now Pat. No. 9,556,649, which is a (Continued)

(51) Int. Cl.
*B23C 3/35* (2006.01)
*G06T 7/00* (2017.01)
(Continued)

(52) U.S. Cl.
CPC ............ *G06T 7/0004* (2013.01); *B23C 3/355* (2013.01); *E05B 19/0011* (2013.01);
(Continued)

(58) Field of Classification Search
CPC ....... B23C 3/35; B23C 3/355; B23C 2235/12; B23C 2235/41; B23C 2235/28;
(Continued)

(56) References Cited

U.S. PATENT DOCUMENTS

| 2,148,667 A | 2/1939 | Yoskowitz et al. |
| 3,116,665 A | 1/1964 | Reisner |

(Continued)

FOREIGN PATENT DOCUMENTS

| DE | 10031713 A1 * | 1/2002 | ............... B23C 3/35 |
| WO | WO 02/101180 A2 | 12/2002 | |

(Continued)

OTHER PUBLICATIONS

Description DE10031713, obtained at https://worldwide.espacenet.com/ (last visited Jul. 5, 2017).*

*Primary Examiner* — Ryan Rufo
(74) *Attorney, Agent, or Firm* — Finnegan, Henderson, Farabow, Garrett & Dunner LLP

(57) ABSTRACT

A key identification system that includes a key identification system housing, a key clamp, a key ring support tray, and two digital identifiers is disclosed. The key identification system housing may include a key receiving aperture extending through housing and sized to receive at least some of a key blade of a key. The key clamp is positioned adjacent to the key receiving aperture and allows the system to maintain the key blade in a fixed position within the key identification system housing when the key is inserted into the key receiving aperture. The key ring support tray is typically coupled to the key identification system housing below the key receiving aperture. The two digital identifiers are positioned within the key identification system housing and designed to capture key blade information.

8 Claims, 5 Drawing Sheets

Related U.S. Application Data continuation-in-part of application No. 13/292,023, filed on Nov. 8, 2011, now Pat. No. 9,149,877, which is a continuation-in-part of application No. 13/183,982, filed on Jul. 15, 2011, now Pat. No. 9,073,133.

(60) Provisional application No. 61/671,058, filed on Jul. 12, 2012, provisional application No. 61/411,148, filed on Nov. 8, 2010, provisional application No. 61/413,099, filed on Nov. 12, 2010, provisional application No. 61/497,468, filed on Jun. 15, 2011, provisional application No. 61/364,644, filed on Jul. 15, 2010.

(51) Int. Cl.
*G06K 9/62* (2006.01)
*G06K 9/32* (2006.01)
*E05B 19/00* (2006.01)

(52) U.S. Cl.
CPC ............ *E05B 19/0017* (2013.01); *G06K 9/32* (2013.01); *G06K 9/6267* (2013.01); *B23C 3/35* (2013.01); *B23C 2235/12* (2013.01); *B23C 2235/28* (2013.01); *B23C 2235/41* (2013.01); *G06T 2207/30136* (2013.01); *Y10T 409/300952* (2015.01); *Y10T 409/301008* (2015.01); *Y10T 409/301064* (2015.01)

(58) Field of Classification Search
CPC ......... B23P 15/005; Y10T 409/301064; Y10T 409/301008; Y10T 409/300952
See application file for complete search history.

(56) References Cited

U.S. PATENT DOCUMENTS

| | | | |
|---|---|---|---|
| 3,323,420 A | 6/1967 | Roxburgh | |
| 3,358,561 A | 12/1967 | Roxburgh et al. | |
| 3,413,892 A | 12/1968 | Casey et al. | |
| 3,442,174 A | 5/1969 | Weiner et al. | |
| 3,602,092 A | 8/1971 | Richens | |
| 3,682,041 A | 8/1972 | Essig | |
| 3,796,130 A | 3/1974 | Gartner | |
| 3,865,011 A | 2/1975 | Patriquin | |
| 3,978,764 A | 9/1976 | Patriquin | |
| 4,159,783 A | 7/1979 | Crasnianski | |
| 4,666,351 A | 5/1987 | Marchal | |
| 4,741,652 A | 5/1988 | Marchal | |
| 4,752,876 A | 6/1988 | Couch et al. | |
| 4,899,391 A | 2/1990 | Cimino et al. | |
| 5,128,531 A | 7/1992 | Fadel | |
| 3,172,829 A | 12/1992 | Dellicker, Jr. | |
| 5,271,698 A | 12/1993 | Heredia et al. | |
| 5,671,523 A | 9/1997 | Juchinewicz | |
| 5,807,042 A | 9/1998 | Almblad et al. | |
| 5,908,273 A | 6/1999 | Titus et al. | |
| 6,064,747 A | 5/2000 | Wills et al. | |
| 6,065,911 A | 5/2000 | Almblad et al. | |
| 6,152,662 A | 11/2000 | Titus et al. | |
| 6,543,972 B1 | 4/2003 | Cimino | |
| 6,895,100 B1 | 5/2005 | Pacenzia et al. | |
| 2001/0033781 A1* | 10/2001 | Wills ..................... | B23C 3/35 409/81 |
| 2002/0141843 A1* | 10/2002 | Mueller .................. | B23C 3/35 409/132 |
| 2007/0224008 A1 | 9/2007 | Bass et al. | |
| 2008/0145163 A1 | 6/2008 | Freeman et al. | |
| 2010/0278437 A1 | 11/2010 | Thompson et al. | |
| 2011/0297691 A1 | 12/2011 | Freeman | |
| 2013/0170693 A1 | 7/2013 | Marsh et al. | |

FOREIGN PATENT DOCUMENTS

| | | | |
|---|---|---|---|
| WO | WO 2008/066857 A2 | 6/2008 | |
| WO | WO 2010/127354 A1 * | 11/2010 | ............... G06K 9/48 |

* cited by examiner

KEY IDENTIFICATION SYSTEM

CROSS REFERENCE TO RELATED APPLICATIONS

This application is a divisional application of application Ser. No. 13/940,156, filed Jul. 11, 2013, pending, which is a continuation-in-part application of U.S. patent application Ser. No. 13/292,023 to Mueller et al. entitled "Interaction between a Key Duplication Housing and a Key Blank Carrier," filed on Nov. 8, 2011, now U.S. Pat. No. 9,149,877, and is a continuation-in-part application of U.S. patent application Ser. No. 13/183,982 to Mueller et al. entitled "Key Blank and Carrier Adapted for Positioning a Key Blank in a Cutter During Bit Cutting," which was filed on Jul. 15, 2011, now U.S. Pat. No. 9,073,133, the disclosures of each of which are hereby incorporated herein by reference. This document also claims the benefit of the filing dates of U.S. Provisional Patent Applications: 61/413,099 to Hagen et al. entitled "Key Duplication Machine Cutting System," which was filed on Nov. 12, 2010, 61/497,468 to Hagen et al. entitled "Key Packaging and Duplication Systems," which was filed on Jun. 15, 2011, 61/411,148 to Mueller et al. entitled "Key Duplication Machine Identification System" which was filled on Nov. 8, 2010, and 61/364,644 to Hagen et al. entitled "Key Duplication Packaging and Standard Reference Features," which was filed Jul. 15, 2010, the disclosures of all of which are hereby incorporated herein in their entirety by this reference.

This document also claims the benefit of the filing date of U.S. Provisional Patent Application 61/671,058, entitled "KEY DUPLICATION HOUSING AND STANDARD REFERENCE FEATURES" to Mueller et al., which was filed on Jul. 12, 2012, the disclosure of which is hereby incorporated herein by reference.

BACKGROUND

1. Technical Field

Aspects of this document relate generally to key identification systems for key duplicating systems.

2. Background Art

Conventionally, when a master key for opening a lock is duplicated, it is duplicated by first identifying or classifying the master key to be able to identify an appropriate key blank for the duplicate key. Conventional systems for key identification have required the operation skills of a trained worker to properly identify the master key and subsequently select the appropriate key blank. Other automated systems have used optics to identify a master key, but are susceptible to inefficiency and error due to the likelihood of movement of the master key during identification.

SUMMARY

According to one aspect, a key identification system comprises a key identification system housing, a key clamp, a key ring support tray, and one or more key identifiers. The key identification system housing comprises a key receiving aperture extending therethrough and sized to receive at least a portion of a key blade of a key. The key clamp is positioned adjacent the key receiving aperture and operable to maintain the key blade in a fixed position within the key identification system housing when the key is inserted into the key receiving aperture. The key ring support tray is coupled to the key identification system housing proximate the key receiving aperture. The one or more key identifiers are positioned within the key identification system housing.

Particular implementations and embodiments may comprise one or more of the following. The key ring support tray may be positioned with an upper surface at between about one half to four inches vertically below the key receiving aperture and extends out from the key identification system housing between about two to about four inches. The one or more key identifiers may comprise at least two digital identifiers positioned within the key identification system housing wherein a first digital identifier of the at least two digital identifiers is positioned to maintain an substantially perpendicular angle toward the key blade when the key is inserted into the key receiving aperture, and a second digital identifier of the at least two digital identifiers is positioned at an acute angle relative to the key blade. An alignment clamp may be within the key identification system housing, the alignment clamp comprising a first alignment bracket biased towards a second alignment bracket and being movable between an aligning position and a retracted position, wherein in the aligning position the key is aligned in a horizontal direction between the first and second alignment brackets when the key is inserted into the key receiving aperture, and in the retracted position the alignment clamp retracts away from the key receiving aperture to expose the key blade to at least one of the first and second digital identifiers. The key clamp may further comprise one or more biasing members coupled to the first alignment bracket and one or more pins extending between the first and second alignment brackets. An alignment clamp may be within the key identification system housing, the alignment clamp comprising a fixed first arm, a movable second arm, a movable third arm, a movable fourth arm, and an alignment aperture comprising a boundary formed by at least a portion of each of the first, second, third, and fourth arms, wherein the second, third, and fourth arms are biased toward the alignment aperture such that when the key is inserted into the alignment aperture, the second, third, and fourth arms move outward from the alignment aperture and each of the first, second, third, and fourth arms exert pressure on each side of the key blade. An alignment clamp may be within the key identification system housing, the alignment clamp comprising a first arm, a second arm, a third arm, and a fourth arm together the first, second, third and fourth arms surrounding a key alignment clamp aperture, wherein relative to a position of the first arm, the second arm is moveable in four directions, the third area is moveable in four directions and the fourth arm is moveable in at least two directions. The clamp may comprise a key clamp coupled to key identification housing adjacent the key receiving aperture and positioned to clamp a portion of a key head of the key while exposing the key blade to at least one of the first and the second digital identifiers when the key is inserted into the key receiving aperture. The key tray may be movable between a raised and a lowered position. A movable guard may be biased to cover the key receiving aperture when the key is removed from the key receiving aperture and retract into the key identification housing when the key is inserted into the key receiving aperture. The clamp may comprise a biased clamp arm configured to pressure on one side of the key when the key is inserted into the key receiving aperture.

According to another aspect, a method of identifying a key in a key identification system comprises inserting a key blade of a key into a key receiving aperture of a key identification system housing; fixedly positioning the key blade within the key identification system housing with a clamp positioned adjacent the key receiving aperture; supporting key chain items on a key ring support tray positioned proximate the key receiving aperture; capturing an image of the key blade with at least one digital identifier positioned within the key identification system housing; and removing the key blade from the key receiving aperture.

Particular implementations and embodiments may comprise one or more of the following. Supporting the key chain items on the key ring support tray may comprise supporting the key chain items on the key ring support tray positioned with an upper surface at between about one half to four inches vertically below the key receiving aperture and extending out from the key identification system housing between about two to about four inches. Capturing the image of the key blade with the least one digital identifier may comprise capturing the image of the key blade with a first digital identifier positioned substantially perpendicular to the key blade and a second digital identifier positioned an acute angle relative to the key blade. Aligning the key in a horizontal direction with an alignment bracket within key identification system housing. Retracting the alignment bracket after the key is aligned and before the at least one digital identifier captures the image of the key blade. Aligning the key with a plurality of arms of an alignment clamp, the plurality of arms comprising a fixed first arm, a movable second arm, a movable third arm, and a movable fourth arm that form a boundary of an alignment aperture, wherein the second, third, and fourth arms are biased toward the alignment aperture such that when the key is inserted into the alignment aperture, the second, third, and fourth arms move outward from the alignment aperture and each of the first, second, third, and fourth arms exert pressure on each side of the key blade. Aligning the key with a plurality arms of an alignment clamp, the plurality of arms comprising a first arm, a second arm, a third arm, and a fourth arm wherein together the first, second, third and fourth arms surrounding a key alignment clamp aperture, wherein relative to a position of the first arm, the second arm is moveable in four directions, the third arm is moveable in four directions and the fourth arm is moveable in at least two directions. Fixedly positioning the key blade with the clamp may comprise fixedly positioning the blade within the key identification system housing by clamping a key head of the key with a biased clamp.

According to another aspect, a key alignment clamp comprises a first arm, a movable second arm adjacent the first arm, a movable third arm adjacent the movable second arm, a movable fourth arm adjacent the movable third arm and the first arm, and an alignment aperture comprising a boundary formed by at least a portion of each of the first, second, third, and fourth arms. The second, third, and fourth arms may be biased toward the alignment aperture such that when a key is inserted into the alignment aperture, the second, third, and fourth arms move outward from the alignment aperture and each of the first, second, third, and fourth arms contact at least one side of the key blade.

Particular implementations and embodiments may comprise one or more of the following. The first, second, third, and fourth arms may form a plane and the second and third arms are movable within the plane in two perpendicular directions and the fourth arm is movable within the in a single direction. A first biasing member extending between the second arm and a first protrusion on the first arm, a second biasing member extending between the third arm and a second protrusion on the second arm, a third biasing member extending between the fourth arm and a third protrusion on the third arm, and a fourth biasing member extending between the first arm and a fourth protrusion on the fourth arm. Relative to a position of the first arm, the second arm is moveable in four directions, the third arm is moveable in four directions and the fourth arm is moveable in at least two directions. The first arm may have a fixed position.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified or narrowed in some way, then such noun, term, or phrase will expressly include additional adjectives, descriptive terms, or other modifiers in accordance with the normal precepts of English grammar. Absent the use of such adjectives descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶ 6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended key identification system and/or assembly procedures for a key identification system will become apparent for use with implementations of key identification systems from this disclosure. Accordingly, for example, although particular key identification systems are disclosed, such key identification systems and implementing components may comprise any shape, size, style, type, model, version, measurement, concentration, material, quantity, and/or the like as is known in the art for such key identification systems and implementing components, consistent with the intended operation of a key identification system.

Figure 1:
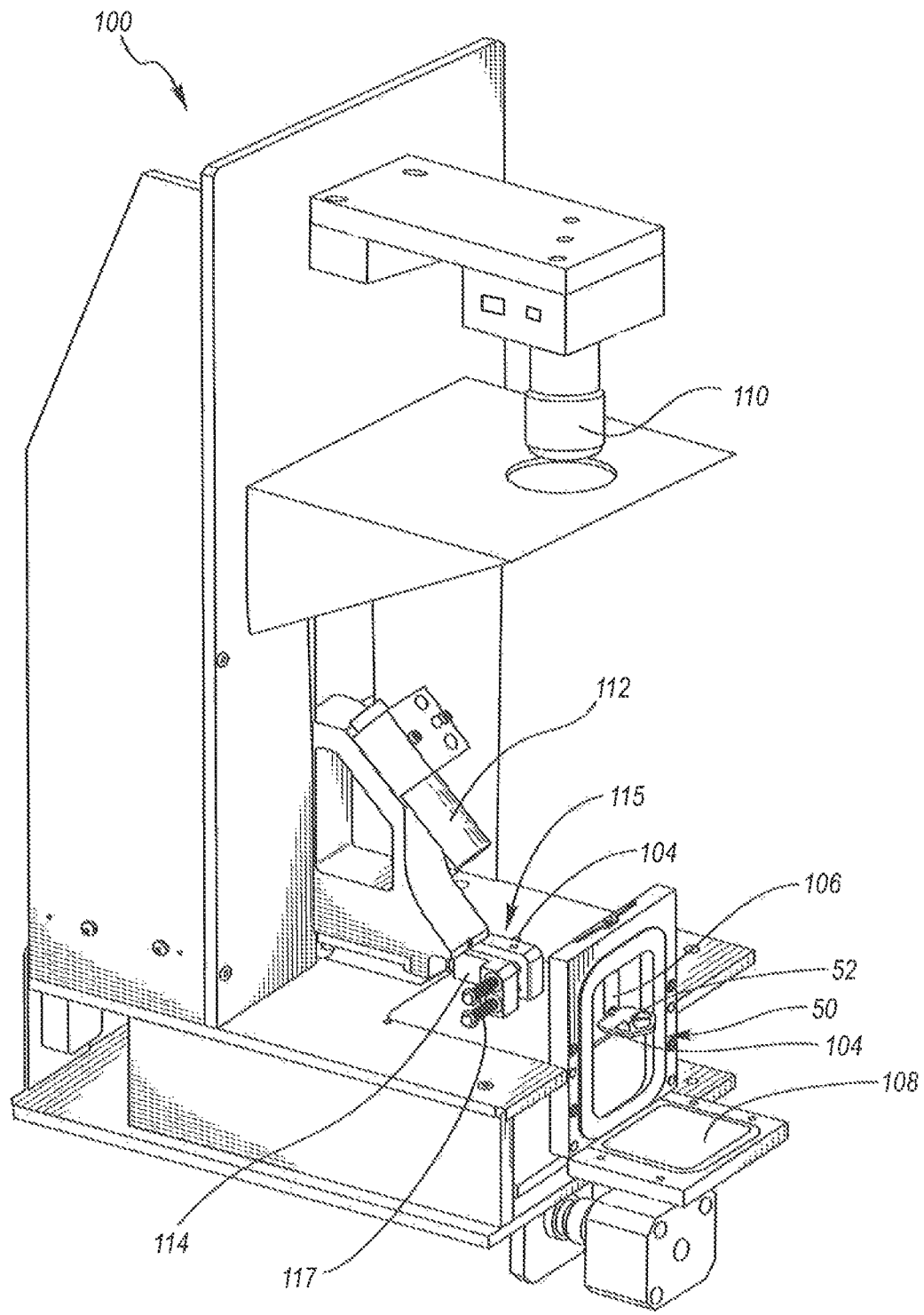
FIG. 1 is a perspective view of a key identification system.

In particular implementations of a key identification system 100 as illustrated in FIG. 1, a key identification system comprises a key receiving aperture 104, a key clamp 106, a key ring support tray 108, a first 110 and a second 112 digital identifier, and an alignment clamp 115. Key receiving aperture 104 is typically sized so that at least a portion of a key 50 passes through the key receiving aperture 104. In some embodiments, the key receiving aperture 104 is sized to allow only the key blade 52 to pass through the key receiving aperture 104, while in other embodiments the key receiving aperture 104 is sized to allow at least a portion of the key head 54 to pass through or be inserted into the key receiving aperture 108. In still other embodiments, the key receiving aperture 104 is adjustable to allow or prevent either different types or sizes of keys 50, or different portions of a key 50. In some embodiments of the key identification system 100, the key receiving aperture 104 comprises a hole extending through the key identification system housing 102 or a detachable wall coupled to the key identification system housing 102. The hole may by comprise a singular body that forms a border of the key receiving aperture 104, or alternatively a plurality of fixed or movable parts may together form the boundary of the key receiving aperture 104, as described in greater detail below.

Particular embodiments of a key receiving aperture 104 comprise one or more alignment features on the perimeter of the key receiving aperture. The alignment features are typically positioned to correspond to common features of various key blades to receive a key in a predetermined fashion. The one or more alignment features may also aid in maintaining the key blade in a fixed position with respect to the digital identifiers within the key identification system housing.

Figure 2:
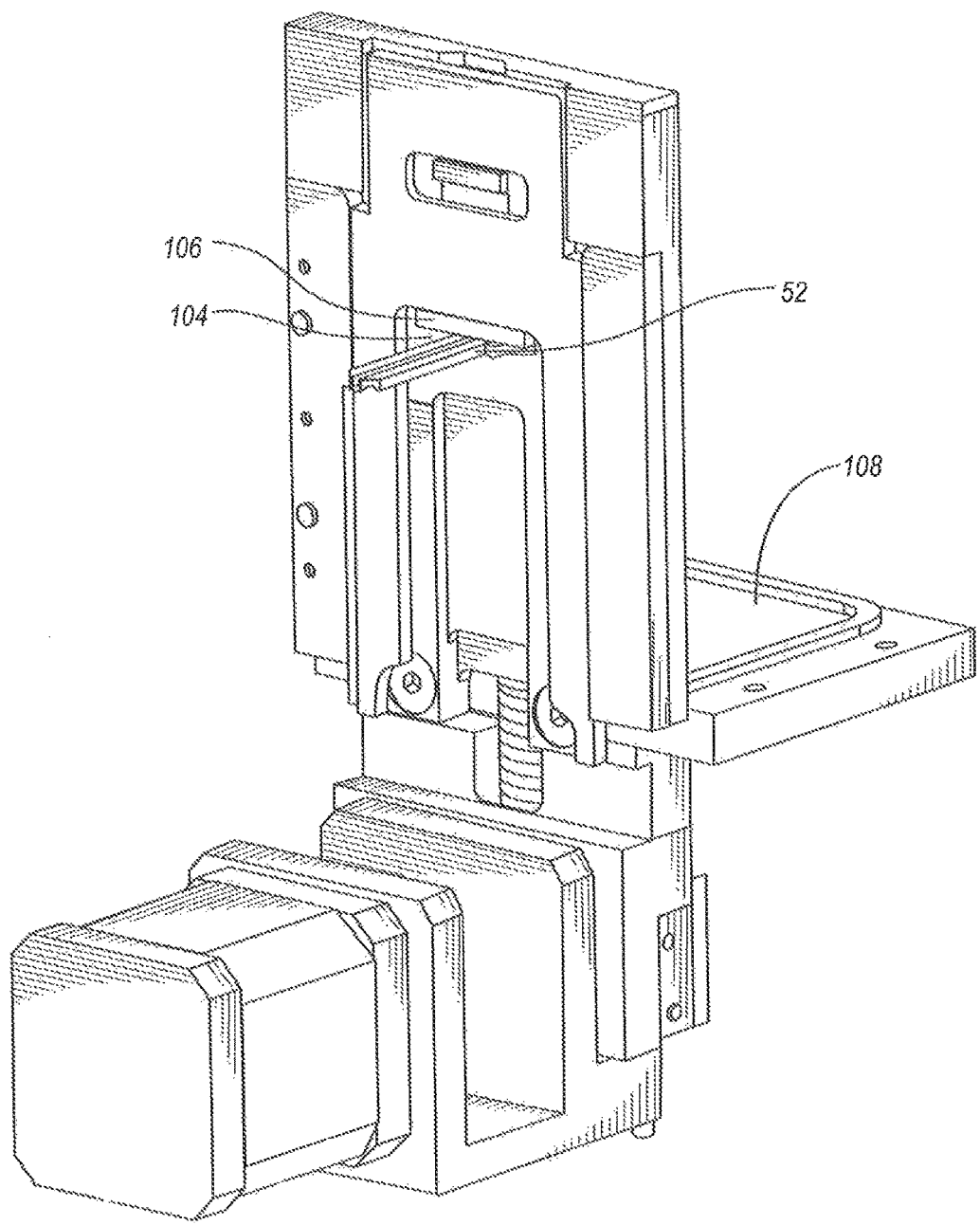
FIG. 2 is a perspective view of a key clamp and platform.

In one or more embodiments of a key identification system 100, a key clamp 106 (FIG. 2) is positioned adjacent to the key receiving aperture 104. In operation, the key clamp 106 clamps at least a portion of a key 50 inserted into the key receiving aperture 104 and maintains the key 50 in a fixed or substantially fixed position within the key identification system housing 102. The key clamp 106 may comprise any configuration apparent to a person having skill in the art for clamping or maintaining the key 50 in a fixed position at least partially within the key identification system housing 102. The key clamp 106 typically fastens on a key 50 and remains fastened until the identification process is complete and the key 50 is removed from the key receiving aperture 104. In one or more embodiments of a key clamp 106, a user may be required to manually fasten the key clamp 106 after at least a portion of a key 50 is inserted into the key receiving aperture 104. For example, in particular embodiments, a user fastens the key clamp 106 to the key 50 using a knob, handle, or combination thereof. In other particular embodiments, an electronic motor may provide the necessary force required for a key clamp 106 to fasten on a key 50.

In one or more embodiments, a key clamp 106 is coupled to the key identification system housing 102 and adjacent to the key receiving aperture 104. The key clamp 106 secures the key head 54 rather than the key blade 52 in a particular embodiment, thus exposing an entire side of the key blade 52 to a digital identifier. Clamping or gripping the key head 54 typically provides a more firm grip because the key head 54 comprises a wider surface on which the key clamp 106 may apply pressure.

In one or more embodiments, the key clamp 106 comprises only one arm that remains biased within the key identification system housing 102. The one arm of the key clamp 106 extends from within the key identification system housing 102 and exerts pressure on one side of a key 50, either the key head 54 or the key blade 52, inserted into the key receiving aperture 104. As the one arm of the key clamp 106 extends pressure on one side of the key 50, the other side of the key 50 is pressed against a perimeter or boundary of the key receiving aperture 104. As with other key clamp embodiments, the key clamp 106 may clamp the key 50 in response to manual operation of a user, such as repositioning a knob, handle, or the like, or alternatively in response to an electronic motor. In one or more embodiments, the key clamp 106 is biased with a spring. Although particular embodiments of a key clamp 106 are described herein, other clamping mechanisms known in the art may be utilized to secure the key without departure from the scope of this disclosure.

Figure 6:
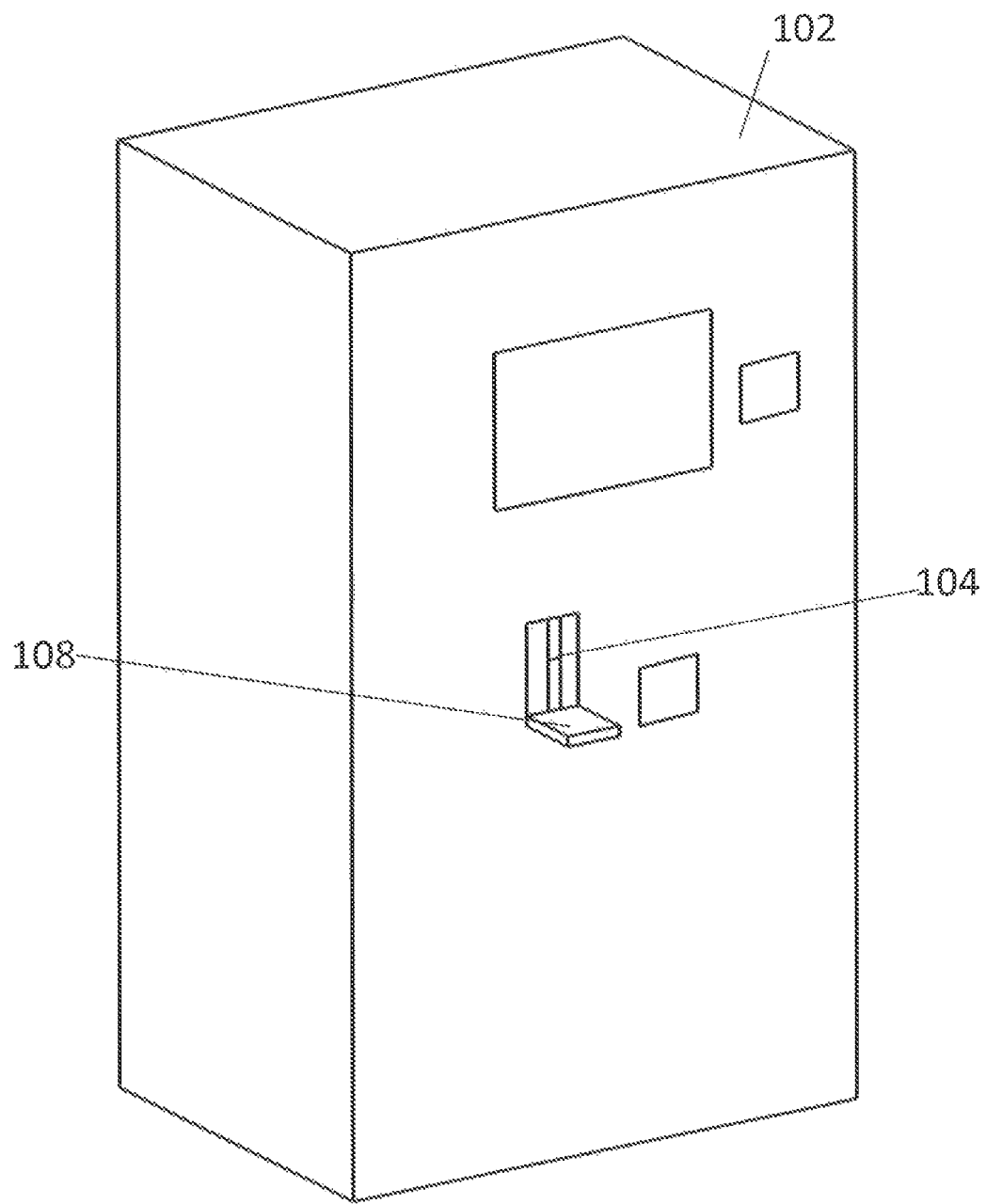
FIG. 6 is a perspective view of a key duplication system.

One or more embodiments of a key identification system 100 may further comprise a key ring support tray 108. For a most accurate reading by the digital identifiers, the key 50 maintained within the key receiving aperture 104 should not be subject to forces beyond the key clamp 106 or other clamping or alignment apparatuses of the key identification system 100. Many users, however, desire to copy a key 50 that is coupled to one or more key chains or key ornaments dangling from a key chain. In particular embodiments, a key support tray 108 is coupled to the key identification system housing 102 (shown in FIG. 6) to support the weight of additional key ring items coupled to the key. In particular embodiments, the key support tray 108 is positioned with an upper surface at between about one half to four inches from the key receiving aperture 104 and extends between about two to about four inches horizontally from the surface through which the key receiving aperture 104 extends. Moreover, the key ring support tray 108 alleviates the need for separating the key 50 from other key ring items coupled to the key 50 before inserting the key 50 into the key receiving aperture 104. The key ring support tray 108 may be coupled to the key identification system housing 102 or otherwise positioned below the key receiving aperture 104. The key chain items may include but are not limited to other keys, car locking/unlocking mechanisms, key rings, pocket knives, ornamental key chains, frequent shopper ID cards, and/or anything a user typically couples to a key chain. In some embodiments, the key ring support tray 108 is coupled directly to the key identification system housing 102, while in other embodiments, the key ring support tray 108 is coupled to a detachable wall that is coupled to the key identification system housing 102. A key ring support tray 108 is vertically adjustable in one or more embodiments, allowing a user to customize the height of the key ring support tray 108 and ensure that necessary support is given to the key 50 extending into the key receiving aperture 104 given the user's particular key ring and attachments. In embodiments wherein the key ring support tray 108 is adjustable, the key ring support tray is positionable between raised position (an example of which is illustrated in FIG. 1) and a lowered position (an example of which is illustrated in FIG. 6) relative to the key receiving aperture 104. The key ring support tray 108 may be movable with a spring, a knob, a latching mechanism, and the like or any combination thereof.

One or more embodiments of a key identification system 100 include at least one digital identifier. Particular embodiments of a key identification system 100 comprise a first digital identifier 110 and second digital identifier 112. The first digital identifier 110 is typically positioned within the key identification system housing 102 at an angle that is approximately perpendicular to the key blade 52 held within the key receiving aperture 104. Positioning of the first digital identifier 110 such that it is approximately perpendicular to a key blade 52 that has been inserted into the key receiving aperture allows the first digital identifier 110 to capture an image of the key blade 52 either directly above or below the key blade 52.

Embodiments comprising a second digital identifier 112 are also contemplated. The second digital identifier 112 may be positioned within the key identification system housing 102 at an acute angle relative to a key blade 52 maintained within the key receiving aperture 104. For example, the second digital identifier 112 may be positioned at approximately 30, 45, or 60 degrees, or alternatively anywhere between 0 and 90 degrees relative to a key blade 52 maintained within the key receiving aperture 104. Positioning of the first 110 and second 112 digital identifiers as described allows for more accurate image capturing of the key blade 52. Embodiments are contemplated, however, that comprise only one digital identifier positioned at either of the positions described in relation to the first 110 and second 112 digital identifiers. In still other embodiments, a third, fourth, fifth, or any number of digital identifiers may be included in the system at any of the positions previously described.

In particular embodiments of the key identification system 100, a digital identifier may comprise any non-contact sensor, a stationary camera inside the housing to take a picture of the key or its blade, or some other scanning method to gather limited data from the key for the purpose of reading the key bit pattern and identifying the key. In other embodiments, a contact sensor may be used. A particular embodiment may also identify a key type and its bit pattern even if the key is damaged by collecting limited information from the key. U.S. Provisional Patent Application No. 61/411,148, filed Nov. 8, 2010 and titled "Key Duplication Machine Identification System," the disclosure of which is hereby incorporated herein by reference, discloses more details on contact and non-contact sensor options for identifying a key in a key identification system. The ability to identify a large number of key models may involve analysis of the key details with a detailed database to compare a key model with other available key Models that may allow for accurate identification of key types.

Figure 3:
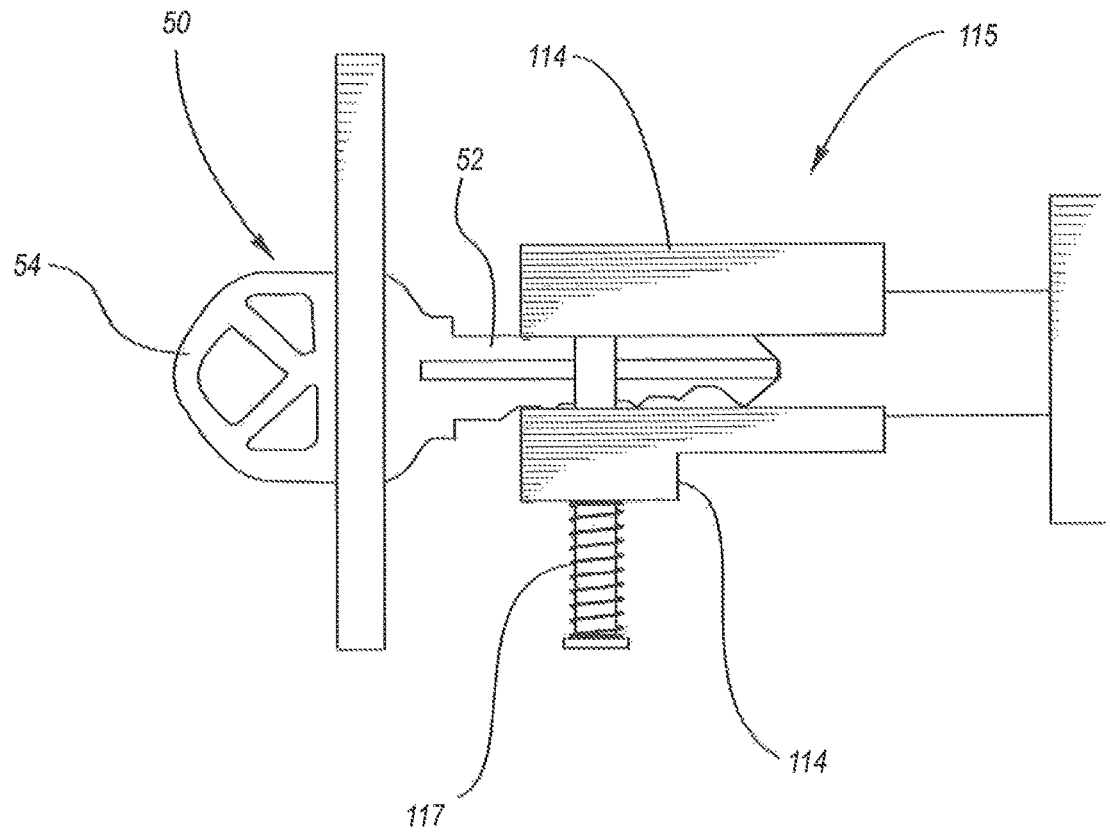
FIG. 3 is a top view of a key clamp and alignment clamp.

One or more embodiments of a key identification system 100 comprise a key alignment clamp 115 comprising two or more alignment brackets 114. The alignment clamp 115 is movable along a horizontal axis within the key identification system housing 102 between a retracted position (as exemplified in FIG. 1) and an aligning position (as exemplified in FIG. 3) in some embodiments. The alignment brackets 114 align a key 50 in a horizontal direction when the key 50 is inserted into the key receiving aperture 104, and the clamp 106 or some other portion of the alignment claim 115 secures the key once the key 50 is aligned. In some embodiments, once the key 50 is secured, the alignment brackets 114 retract within the housing along its horizontal axis to allow the key blade 52 to be exposed to at least one digital identifier within the key identification system housing 102.

Some embodiments of the alignment clamp 115 comprises one or more biasing members 117. The biasing members 117 may comprise any biasing member known in the art, such as but not limited to a spring. In a particular embodiment, the alignment clamp 115 comprises two biasing members 117 each coupled to a first alignment bracket of the two alignment brackets with a different rod or pin. The biasing members 117 bias the first alignment bracket toward a second alignment bracket of the two alignment brackets 114. The effect of the biasing members 117 is to clamp, hold, or merely position a key 50 in the proper alignment position for reading by the one or more digital identifiers. In such an embodiment, either the first or the second alignment bracket comprises a side wall that acts as a reference wall. When a key is inserted between the clamps, the spine or base of the key blade 52 opposite the ridges of the key blade aligns against the side wall of the alignment bracket. The alignment clamp 115 may further comprise a stop element that prevents the biasing members 117 from biasing the first alignment bracket into direct contact with the second alignment bracket.

In one or more embodiments of the alignment clamp 115, the pins extend through the first alignment bracket to at least the second alignment bracket. Alternatively, separate pins or rods may extend between the first and second alignment brackets. In one or more embodiments, the pins act as the stop element previously described. The pins positioned between the first and second alignment brackets, whether separate or integral with the pins on the opposite side of the first alignment bracket, may be positioned to further align the key 50 for reading by the one or more digital identifiers. For example, two pins positioned between alignment brackets 114 may be spaced from one another at a distance substantially equal or slightly greater than a depth of a particular key 50. Such positioning of the pins allows for vertical alignment of the key 50 between the pins.

Figure 4:
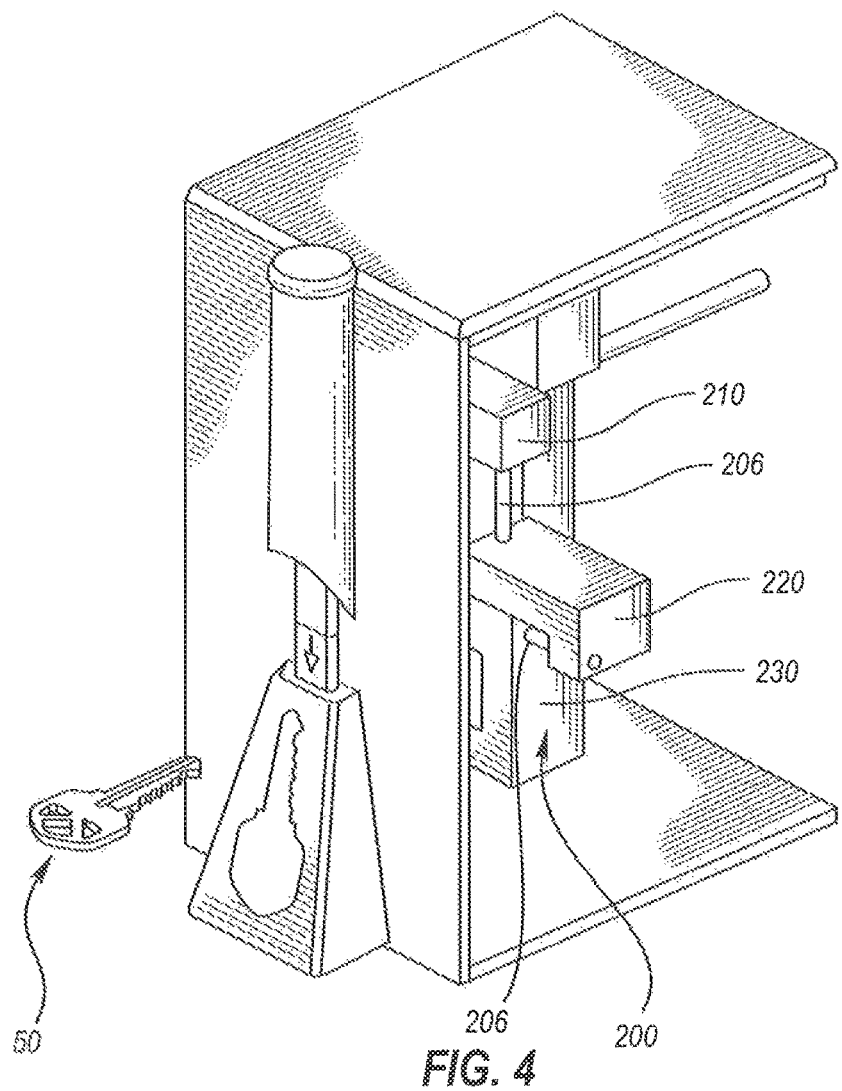
FIG. 4 is a perspective view of a second embodiment of an alignment clamp.
Figure 5:
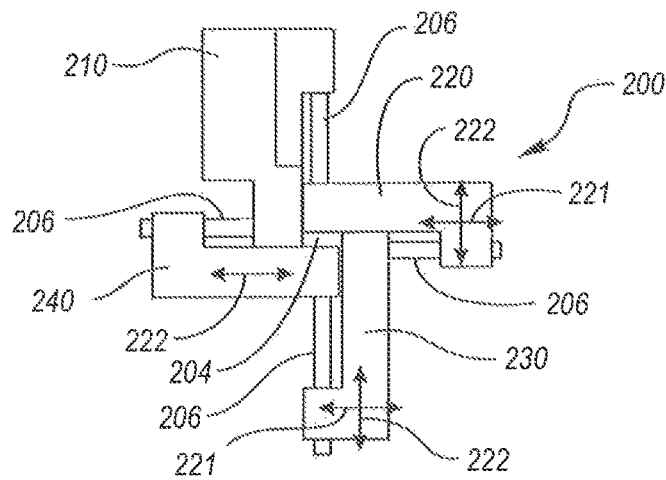
FIG. 5 is a front view of a second embodiment of an alignment clamp.

One particular embodiment of an alignment clamp 200 is shown in FIGS. 4 and 5. The alignment clamp 200 typically comprises a fixed first arm 210, a movable second arm 220, a movable third arm 230, and a movable fourth arm 240. An alignment aperture 204 extends through the alignment clamp 200 and comprises a boundary formed by at least a portion of each of the first 210, second 220, third 230, and fourth 240 arms. The first arm 210 is typically fixed, while the second 220, third 230, and fourth 240 arms are typically moveable. In a particular embodiment second 220 and third 230 arms are movable both horizontally and vertically as represented by directional arrows 221 and 222, respectively, and the fourth arm 240 is movable only horizontally. In other embodiments, the second 220 and third 230 arms are movable in two perpendicular directions, while the fourth arms is moveable in only one direction. In any of the embodiments, horizontal, vertical, or other movement by the second 220, third 230, and fourth 240 arms is maintained within the plane of the alignment clamp 200.

In one or More embodiments of an alignment clamp 200, each arm 210, 220, 230, 240 is coupled to a different spring 206. In a particular embodiment, a first spring 206 is coupled between the second arm 220 and a first protrusion 212 on the first arm 210; a second spring 206 is coupled between the third arm 230 and a second protrusion 222 on the second arm 220; a third spring 206 is coupled between the fourth arm 240 and a third protrusion 232 on the third arm 230; and a fourth spring 206 is coupled between the first arm 210 and a fourth protrusion 242 on the fourth arm 240. Together, the plurality of springs 206 provide a biased force that keeps the alignment clamp aperture 204 as small as possible. Upon insertion of a key 50 within the alignment clamp aperture 204, each the second 220, third 230, and fourth 240 arms moves outward from the alignment clamp aperture 204. The second 220, third 230, and fourth 240 arms, in conjunction with the fixed first arm 210, exert pressure on all sides of the key blade 52 or key head 54, thus securing the key 50 within the alignment clamp 200. When the key is removed from the alignment aperture 204, each arm 210, 220, 230, 240 returns to its biased position and thereby reduces the size of the alignment aperture 204. In particular embodiments, the first arm 210 has a fixed position and relative to the fixed position of the first arm 210, the second arm 220 is moveable in four directions, the third arm 230 is moveable in four directions, and the fourth arm 240 is moveable in two directions. Thus, when a key is placed within the alignment clamp aperture 204 with the key spine against the first arm 210, the sides and teeth/bits of the key are properly centered by the other arms 220, 230, 240.

One or more embodiments of a key identification system 100 comprise a movable guard coupled or otherwise positioned proximate the key receiving aperture 104. The movable guard is, in a particular embodiment, biased to close the key receiving aperture 104. When a key 50 is inserted into the key receiving aperture 104, the movable guard retracts either into the key identification system housing 102 or away from the key receiving aperture 104. In some embodiments, the movable guard works in conjunction with the key clamp 106 to maintain a key 50 in a fixed position. In still other embodiments, the movable guard comprises the one arm of the key clamp 106. In one or more embodiments, the movable guard is a spring hinged door that is biased to close the key receiving aperture 104 unless a key 50 is directed into the movable guard.

In particular implementations of the key identification system 100, a key identification system housing 102 may be coupled with directional signs adjacent to the key receiving aperture 104 to inform a user as to which direction to insert a key 50 into the housing 102. For example a directional sign may be an engraving of a key, an arrow, or a written instruction to symbolize the direction that a key 50 should be inserted into the key receiving aperture 104. In particular embodiments of the key receiving aperture 104, the key receiving aperture 104 only receives a key in the specific direction symbolized on the housing 102 and any attempt by the user to insert a key 50 in a different direction shall be unsuccessful. Nevertheless, particular implementations of the key identification system 100 may allow a key blade 52 to be inserted despite its direction and may obtain information from the key 50 despite the direction that the key blade 52 is inserted into the housing 102. For example, a digital identifier may recognize the key bit pattern regardless of whether the key 50 is inserted into the key receiving aperture 104 face-up or face-down.

Also contemplated herein is a method of identifying a key in a key identification system. One or more embodiments of the method comprise inserting a key blade 52 of a key 50 into a key receiving aperture 104 of a key identification system housing 102. Insertion of a key blade 52 into the key receiving aperture 104 may be assisted or hampered by alignment features within the key receiving aperture 104. An embodiment of the method further comprises positioning the key blade 52 within the key identification system housing 102 with a clamp positioned adjacent the key receiving aperture 104. Although not required, some embodiments of the method include supporting key chain items on a key tray 108 positioned below the key receiving aperture 104. Positioning the key blade 52 within the key identification system housing 102 may comprise fixedly positioning the key blade 52 within the key identification system housing 102 by clamping a key head 54 of the key 50 with a biased clamp.

One or more embodiments of the method comprise aligning the key blade 52 within the housing 102 after the key blade 52 has been inserted into the key receiving aperture 104. In particular embodiments, aligning the key comprises aligning the key 50 in a horizontal direction with an alignment bracket 114 within key identification system housing. In a more particular embodiment, the method comprises retracting the alignment bracket 114 after the key 50 is aligned and before the at least one digital identifier captures the image of the key blade 52.

One or more embodiments of the method also comprise aligning the key 50 with a plurality of arms of an alignment clamp 200. The plurality of arms may comprise a fixed first arm 210, a movable second arm 220, a movable third arm 230, and a movable fourth arm 240 that form a boundary of an alignment aperture 204.

One or more embodiment of the method comprises capturing an image of the key blade 52 with at least one digital identifier positioned within the key identification system housing 102. Capturing the image of the key blade 52 with the least one digital identifier may comprise capturing the image of the key blade with a first digital identifier 110 positioned substantially perpendicular to the key blade 52 and a second digital identifier 112 positioned an acute angle relative to the key blade 52. Once one or more images of the key blade 52 have been captures, the key 50 may be removed from the key receiving aperture 104.

It will be understood that implementations are not limited to the specific components disclosed herein, as virtually any components consistent with the intended operation of a method and/or system implementation for key identification system or key alignment clamp may be utilized. Accordingly, for example, although particular clamps, brackets, trays, springs, digital identifiers, and the like may be disclosed, such components may comprise any shape, size, style, type, model, version, class, grade, measurement, concentration, material, weight, quantity, and/or the like consistent with the intended operation of a method and/or system implementation for a key identification system may be used.

In places where the description above refers to particular implementations of a key identification system, it should be readily apparent that a number of modifications may be made without departing from the spirit thereof and that these implementations may be applied to other key identification systems. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims me intended to be embraced therein.

The invention claimed is:

1. A method of identifying a key in a key identification system, comprising:
    inserting a key blade of a key into a key receiving aperture of a key identification system housing;
    fixedly positioning the key blade within the key identification system housing with a clamp positioned adjacent the key receiving aperture;
    aligning the key with a plurality of arms of an alignment clamp, the plurality of arms comprising a fixed first arm, a movable second arm, a movable third arm, and a movable fourth arm that form a boundary of an alignment aperture, wherein the second, third, and fourth arms are biased toward the alignment aperture such that when the key is inserted into the alignment aperture, the second, third, and fourth arms move outward from the alignment aperture and each of the first, second, third, and fourth arms exert pressure on each side of the key blade;
    supporting key chain items on a key ring support tray positioned proximate the key receiving aperture;
    capturing an image of the key blade with at least one digital identifier positioned within the key identification system housing; and
    removing the key blade from the key receiving aperture.

2. The method of claim 1, wherein supporting the key chain items on the key ring support tray comprises supporting the key chain items on the key ring support tray positioned with an upper surface at between about one half to four inches vertically below the key receiving aperture and extending out from the key identification system housing between about two to about four inches.

3. The method of claim 1, wherein capturing the image of the key blade with the least one digital identifier comprises capturing the image of the key blade with a first digital identifier positioned substantially perpendicular to the key blade.

4. The method of claim 1, wherein fixedly positioning the key blade with the clamp comprises fixedly positioning the blade within the key identification system housing by clamping a key head of the key with a biased clamp.

5. A method of identifying a key in a key identification system, comprising:
    inserting a key blade of a key into a key receiving aperture of a key identification system housing;
    fixedly positioning the key blade within the key identification system housing with a clamp positioned adjacent the key receiving aperture;
    aligning the key with a plurality of arms of an alignment clamp, the plurality of arms comprising a first arm, a second arm, a third arm, and a fourth arm, wherein together the first, second, third and fourth arms surrounding a key alignment clamp aperture, wherein relative to a position of the first arm, the second arm is moveable in four directions, the third arm is moveable in four directions and the fourth arm is moveable in at least two directions;
    supporting key chain items on a key ring support tray positioned proximate the key receiving aperture;
    capturing an image of the key blade with at least one digital identifier positioned within the key identification system housing; and
    removing the key blade from the key receiving aperture.

6. The method of claim 5, wherein supporting the key chain items on the key ring support tray comprises supporting the key chain items on the key ring support tray positioned with an upper surface at between about one half to four inches vertically below the key receiving aperture and extending out from the key identification system housing between about two to about four inches.

7. The method of claim 5, wherein capturing the image of the key blade with the least one digital identifier comprises capturing the image of the key blade with a first digital identifier positioned substantially perpendicular to the key blade.

8. The method of claim 5, wherein fixedly positioning the key blade with the clamp comprises fixedly positioning the blade within the key identification system housing by clamping a key head of the key with a biased clamp.

* * * * *